M. E. HANSON & J. B. KEYSER.
SPRING WHEEL.
APPLICATION FILED OCT. 12, 1915.
1,178,008.
Patented Apr. 4, 1916.
2 SHEETS—SHEET 2.
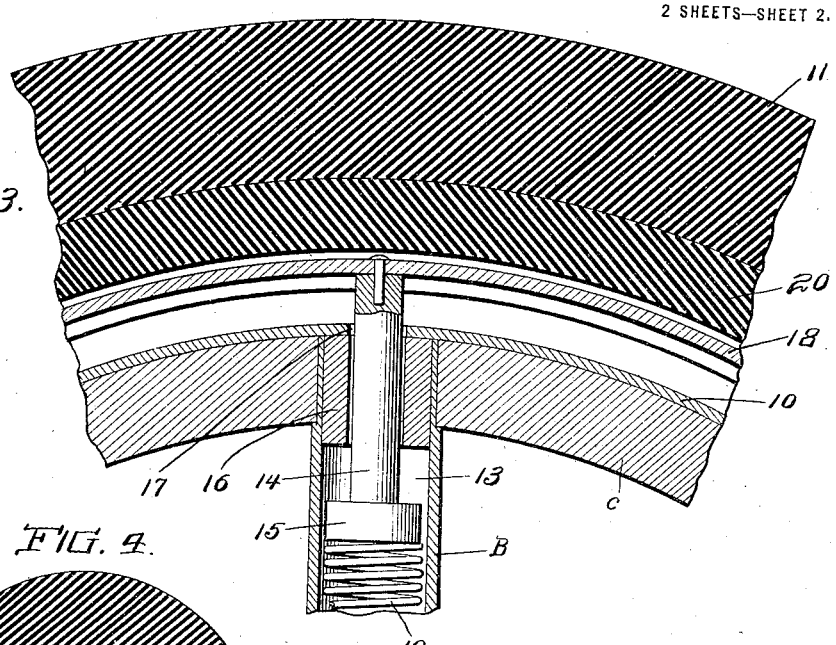
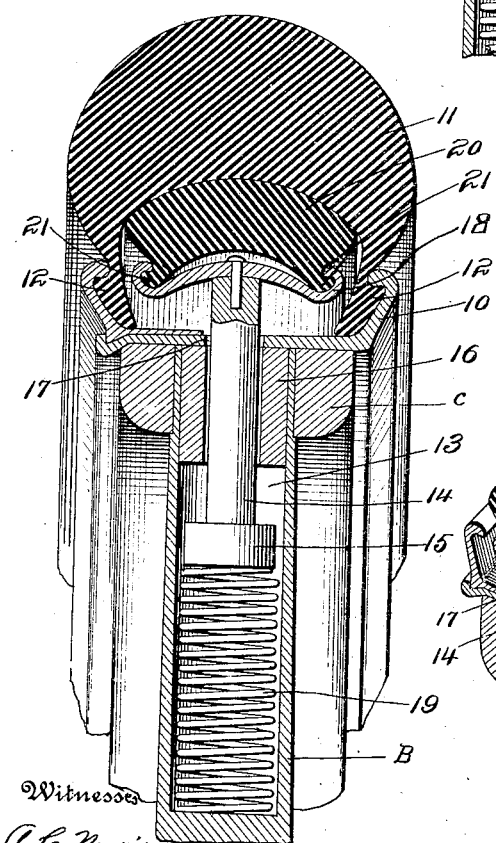
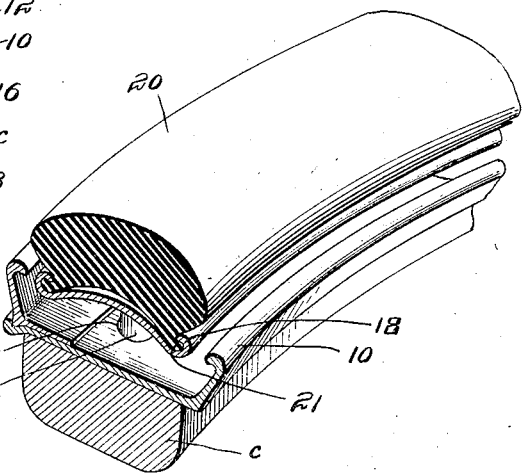
Inventor
M. E. Hanson
J. B. Keyser
By Victor J. Evans

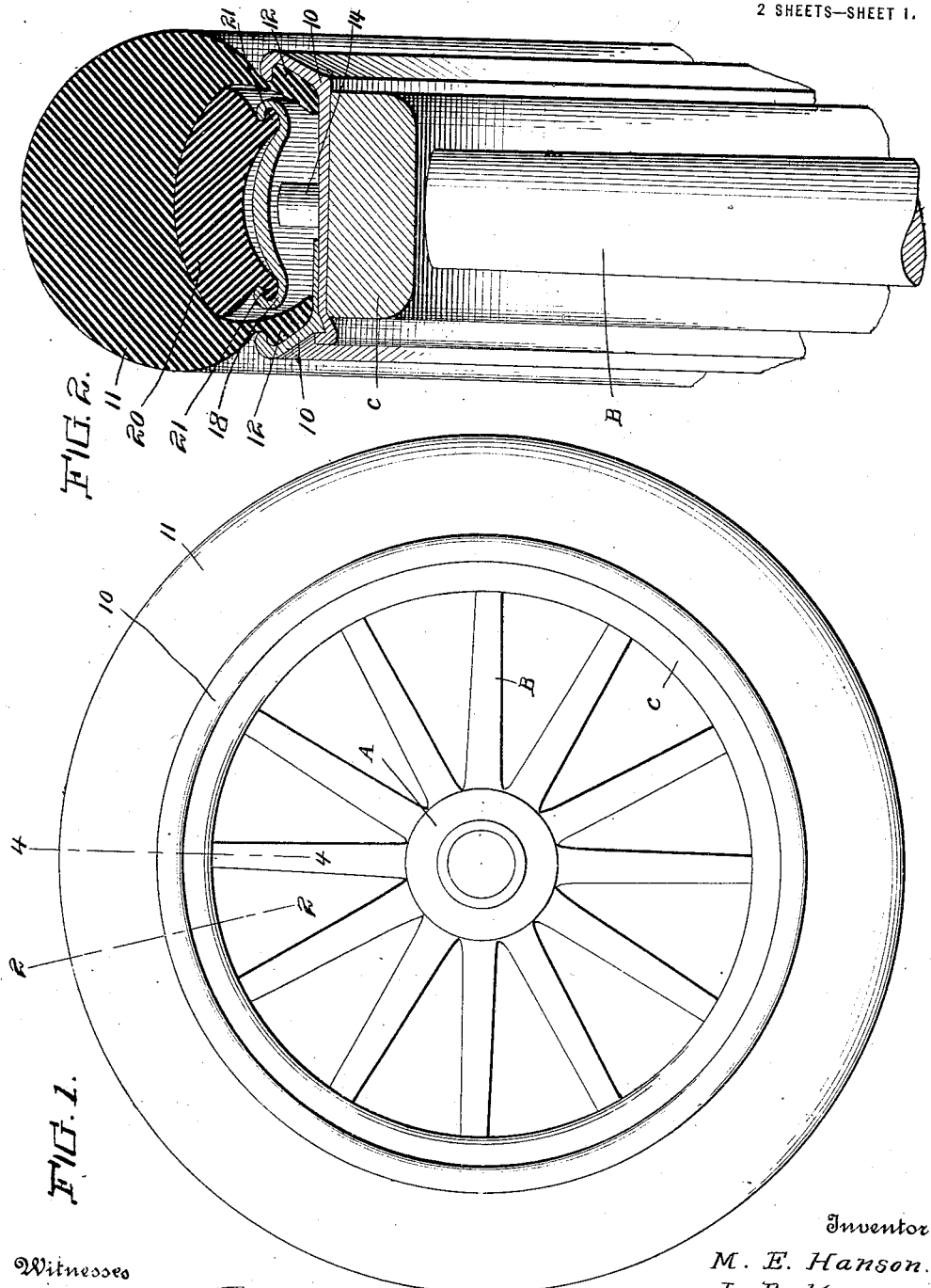

UNITED STATES PATENT OFFICE.

MELVIN E. HANSON AND JOHN B. KEYSER, OF STANLEY, VIRGINIA.

SPRING-WHEEL.

1,178,008. Specification of Letters Patent. Patented Apr. 4, 1916.

Application filed October 12, 1915. Serial No. 55,506.

*To all whom it may concern:*

Be it known that we, MELVIN E. HANSON and JOHN B. KEYSER, citizens of the United States, residing at Stanley, in the county of Page and State of Virginia, have invented new and useful Improvements in Spring-Wheels, of which the following is a specification.

The invention relates to a wheel, and more particularly to the class of resilient or spring wheels for vehicles, automobiles or the like.

The primary object of the invention is the provision of a wheel of this character wherein the tread is resiliently supported upon the body of a wheel so that all shocks and jars incident to the travel of the wheel will be absorbed, thereby relieving excessive strain from the vehicle or automobile during its travel.

Another object of the invention is the provision of a wheel of this character wherein the same is novel in construction to sustain the load of the vehicle or automobile, and the possibility of punctures and blow-outs is entirely eliminated.

A further object of the invention is the provision of a wheel of this character wherein the necessity for inflating the tire is obviated, yet it will have maximum resiliency to withstand shocks and jars, and also the load of the vehicle or automobile, the tire being readily detachable from the felly or rim of the wheel should the occasion require.

A still further object of the invention is the provision of a wheel of this character wherein maximum strength is obtained so that the life of the wheel will be increased.

A still further object of the invention is the provision of a wheel of this character which is simple in construction, reliable and efficient in use, strong, durable, and inexpensive in manufacture.

With these and other objects in view, the invention consists in the construction, combination and arrangement of parts as will be hereinafter fully described, illustrated in the accompanying drawings, and pointed out in the claim hereunto appended.

In the drawings:—Figure 1 is a side elevation of a wheel constructed in accordance with the invention. Fig. 2 is a sectional view on the line 2—2 of Fig. 1. Fig. 3 is a fragmentary enlarged vertical longitudinal sectional view through the wheel. Fig. 4 is a sectional view on the line 4—4 of Fig. 1. Fig. 5 is a fragmentary perspective view looking toward the clencher rim with the outer tire removed.

Similar reference characters indicate corresponding parts throughout the several views in the drawings.

Referring to the drawings in detail, A designates the hub, B the spokes, and C the felly, which constitute the body of the wheel proper. Mounted upon the felly C is a sectional clencher rim 10 which is fastened thereto in any suitable manner, and detachably engaged in this rim is an outer tire casing or shoe 11 formed with the clencher side flanges 12 which engage in the clencher rim 10 for the detachable fastening of the casing or shoe 11 thereon.

Formed in the spokes B in the outer ends thereof are bores 13 which constitute cylinders in which work plungers 14, each being formed at its inner end with a piston head 15, and surrounding this plunger 14 is a sleeve-like bushing 16 which is securely mounted in the outer end of the spokes B, the clencher rim 10 being perforated or formed with openings 17 registering with the bores 13 in the said spokes so that the plungers 14 will work through the openings 17 into the casing or shoe 11, and upon the outer end of the said plungers 14 is an auxiliary clencher rim 18, the same being fastened thereto in any suitable manner.

Located within the bores 13 in the cylinders of the spokes B are coiled expansion springs 19 which operate directly upon the piston heads 15 to force the plungers outwardly of the bores 13 in the said spokes, and these springs 19 serve as shock absorbers.

Detachably mounted upon the auxiliary rim 18 interiorly of the casing or shoe 11 is a cushion annulus 20 which is formed with the clencher side flanges 21 to detachably engage in the clencher rim 18, and this annulus 20 plays against the shoe or casing 11 to hold the same extended so as to have the appearance of being inflated with air, and in this manner the casing or shoe 11 will sustain the load and will eliminate the possibility of punctures or blow-outs as well as obviating the use of air for the inflation thereof.

The springs 19 will absorb all shocks and jars incident to the travel of the wheel so as to relieve excessive strains thereon and prevent such strains from being transmitted to the body of the vehicle or automobile, thus increasing the life of both the wheels and the latter.

From the foregoing description, taken in connection with the accompanying drawings, the construction and manner of operation of the device will be clearly understood, and therefore a more extended explanation has been omitted.

What is claimed is:—

In a wheel, a plurality of spokes having hollow outer ends, a clencher rim mounted on the outer ends of the spokes and having openings communicating with the hollow ends of the spokes, an outer resilient shoe engaged with the clencher rim, plungers working within the hollow ends of the spokes and extending through the openings in the rim, a secondary clencher rim secured to the plungers and disposed concentrically about the first named rim, a resilient cushion annulus engaged in the secondary rim and working against the shoe, and coiled compression springs located within the hollow outer ends of the spokes and acting upon the plungers.

In testimony whereof we affix our signatures in presence of two witnesses.

MELVIN E. HANSON.
JOHN B. KEYSER.

Witnesses:
CHARLES C. LAUDERBACK,
JAS. M. SHULES.